(12) United States Patent
Wu et al.

(10) Patent No.: US 11,949,059 B2
(45) Date of Patent: Apr. 2, 2024

(54) WINDING METHOD, WINDING MACHINE, ELECTRODE ASSEMBLY, AND BATTERY CELL

(71) Applicant: CONTEMPORARY AMPEREX TECHNOLOGY CO., LIMITED, Fujian (CN)

(72) Inventors: Zhiyang Wu, Fujian (CN); Yiruo Wang, Fujian (CN); Gang Lin, Fujian (CN); Guohang Liao, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/213,277

(22) Filed: Jun. 23, 2023

(65) Prior Publication Data

US 2023/0335778 A1    Oct. 19, 2023

Related U.S. Application Data

(63) Continuation of application No. PCT/CN2022/123442, filed on Sep. 30, 2022.

(30) Foreign Application Priority Data

Sep. 30, 2021  (CN) .......................... 202111162507.3

(51) Int. Cl.
*H01M 10/0587* (2010.01)
*H01M 10/04* (2006.01)

(52) U.S. Cl.
CPC ... *H01M 10/0409* (2013.01); *H01M 10/0431* (2013.01); *H01M 10/0587* (2013.01)

(58) Field of Classification Search
CPC ......... H01M 10/0409; H01M 10/0431; H01M 10/0587
USPC ........................................................ 29/623.1
See application file for complete search history.

(56) References Cited

FOREIGN PATENT DOCUMENTS

| CN | 102089920 A | 6/2011 |
| CN | 102163733 A | 8/2011 |
| CN | 103633377 A | 3/2014 |
| CN | 207009588 U | 2/2018 |
| CN | 209401773 U | 9/2019 |
| CN | 209401774 U | 9/2019 |
| CN | 110854447 A | 2/2020 |
| CN | 112467229 A | 3/2021 |
| CN | 113241480 A | 8/2021 |
| CN | 216750028 U | 6/2022 |

(Continued)

OTHER PUBLICATIONS

English language machine translation of "Winding Device" by Mizuno Hirofumi in CN103633377 (A) filed Mar. 12, 2014 (Year: 2014).*

(Continued)

*Primary Examiner* — Jonathan G Jelsma
*Assistant Examiner* — Omar M Kekia
(74) *Attorney, Agent, or Firm* — XSENSUS LLP (57) ABSTRACT

A winding method may comprise clamping heads of an anode plate, a cathode plate and a separator between a first half winding needle and a second half winding needle of a winding needle assembly at a winding station; and rotating the winding needle assembly at the winding station to wind the anode plate, the cathode plate and the separator to form an electrode assembly.

18 Claims, 7 Drawing Sheets

Clamp heads of a cathode plate 11, an anode plate 12 and a separator 13 to the position between a first half winding needle 211 and a second half winding needle 212 of a winding needle assembly 21 at a winding station 221 — S101

Rotate the winding needle assembly 21 at the winding station 221 to wind the cathode plate 11, the anode plate 12 and the separator 13 to form an electrode assembly 1 — S102

(56) References Cited

FOREIGN PATENT DOCUMENTS

| | | |
|---|---|---|
| CN | 216750029 U | 6/2022 |
| JP | 2001-057242 A | 2/2001 |
| JP | 2001-068373 A | 3/2001 |
| JP | 2001-236995 A | 8/2001 |

OTHER PUBLICATIONS

International Search Report and Written Opinion dated Dec. 28, 2022, received for PCT Application PCT/CN2022/123442, filed on Sep. 30, 2022, 9 pages including English Translation.
International Search Report and Written Opinion dated Sep. 7, 2022, received for PCT Application PCT/CN2022/102017, filed on Jun. 28, 2022, 13 pages including English Translation.

* cited by examiner

WINDING METHOD, WINDING MACHINE, ELECTRODE ASSEMBLY, AND BATTERY CELL

CROSS-REFERENCE TO RELATED APPLICATIONS

The present application is a continuation of International Application No. PCT/CN2022/123442, filed Sep. 30, 2022, which claims priority to Chinese Patent Application No. 202111162507.3, entitled "WINDING METHOD, WINDING MACHINE, ELECTRODE ASSEMBLY, AND BATTERY CELL", filed on Sep. 30, 2021, both of which are incorporated herein by reference in its entirety.

TECHNICAL FIELD

The present application relates to the field of batteries, in particular to a winding method, a winding machine, an electrode assembly, and a battery cell.

BACKGROUND ART

In some cases, when a winding machine winds a cathode plate, an anode plate and a separator, the separator is typically wound first, and then the cathode plate and the anode plate are wound. Therefore, when the cathode plate and the anode plate start to be wound, the heads of the cathode plate and the anode plate are prone to be bent.

SUMMARY OF THE DISCLOSURE

In view of the above problem, the present application provides a winding method, a winding machine, an electrode assembly, and a battery cell, in order to solve the problem that, in some cases, when a cathode plate, an anode plate, and a separator are wound, the heads of the cathode plate and the anode plate are prone to be bent.

In a first aspect, an embodiment of the present application provides a winding method for winding a cathode plate, an anode plate and a separator to form an electrode assembly, the winding method including: clamping heads of the cathode plate, the anode plate and the separator between a first half winding needle and a second half winding needle of a winding needle assembly at a winding station; and rotating the winding needle assembly at the winding station to wind the cathode plate, the anode plate and the separator to form the electrode assembly.

According to the winding method provided in the present application, before winding the cathode plate, the anode plate and the separator, the first half winding needle and the second half winding needle directly clamp the heads of the cathode plate, the anode plate and the separator that are fed, instead of the operation of first winding the separator and then winding the cathode plate and the anode plate by means of the separator in some cases. Therefore, the cathode plate and the anode plate can be prevented from being bent at the beginning of winding, and the problem is thus solved that in some cases, when the cathode plate, the anode plate and the separator are wound, the heads of the cathode plate and the anode plate are prone to be bent.

In a second aspect, an embodiment of the present application provides a winding machine, including: a winding mechanism or structure which includes a winding needle assembly, wherein the winding needle assembly is used for winding a cathode plate, an anode plate and a separator to form an electrode assembly, and the winding needle assembly includes a first half winding needle and a second half winding needle, the first half winding needle and the second half winding needle being configured to be relatively movable to clamp the heads of the cathode plate, the anode plate and the separator.

In the winding machine provided in the embodiments of the present application, the winding needle assembly includes the first half winding needle and the second half winding needle that are relatively movable. Before the winding machine winds the cathode plate, the anode plate and the separator, the first half winding needle and the second half winding needle directly clamp the heads of the cathode plate, the anode plate and the separator that are fed, instead of the operation of first winding the separator and then winding the cathode plate and the anode plate by means of the separator in some cases. Therefore, the cathode plate and the anode plate can be prevented from being bent at the beginning of winding, and the problem is thus solved that in some cases, when the cathode plate, the anode plate and the separator are wound, the heads of the cathode plate and the anode plate are prone to be bent.

In a third aspect, an embodiment of the present application further provides an electrode assembly, which is manufactured using the winding method according to any one of the embodiments in the first aspect described above.

The electrode assembly for a battery cell provided by the embodiment of the present application can be manufactured by means of the winding method in the above-described embodiment. In the battery cell, the heads of the cathode plate and the anode plate are flat, and the battery cell has the advantages of stable operation and safe and reliable use.

In a fourth aspect, an embodiment of the present application further provides a battery cell, including an electrode assembly according to any one of the embodiments in the third aspect described above.

Since the battery cell provided by the present application is provided with the electrode assembly in the third aspect described above, the battery cell has all the beneficial effects of the electrode assembly in the third aspect described above.

The above description is only an overview of the technical solution of the present application. In order to more clearly understand the technical means of the present application to implement same according to the contents of the specification, and in order to make the aforementioned and other objects, features and advantages of the present application more obvious and understandable, specific embodiments of the present application are exemplarily described below.

BRIEF DESCRIPTION OF THE DRAWINGS

In order to illustrate the technical solutions of the embodiments of the present application more clearly, the drawings required in the description of the embodiments of the present application will be described briefly below. Obviously, the drawings described below are merely some embodiments of the present application, and for those of ordinary skill in the art, other drawings can also be obtained from these drawings without any creative efforts. In the accompanying drawings, the same reference numerals denote the same or similar parts or elements throughout a plurality of drawings unless otherwise specified. These drawings are not necessarily drawn to scale. It should be understood that these drawings depict only some embodiments according to the disclosure herein and are not to be construed as limiting the scope of the application.

REFERENCE NUMERALS IN THE EMBODIMENTS

1—Electrode assembly, 11—Cathode plate, 12—Anode plate, and 13—Separator;
2—Winding mechanism;
21—Winding needle assembly, 211—First half winding needle, 212—Second half winding needle, 213—Arc-shaped curved surface, 214—First plane, 215—Second plane, 216—Groove,
217—Third plane, 218—Notch, 219—Fourth plane, and 220—Fifth plane;
22—Rotating tower, 221—Winding station, and 222—Non-winding station;
3—Clamping and feeding mechanism, 31—First clamping roller, and 32—Second clamping roller;
4—First cutter; 5—Second cutter;
6—Second guide roller;
7—Finishing adhesive application mechanism; 8—Discharging mechanism; 9—First guide roller;
L—First direction; and M—Second direction.

DETAILED DESCRIPTION OF EMBODIMENTS

Embodiments of the technical solutions of the present application will be described in more detail below with reference to the drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the technical features modified thereby. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: the three instances of A alone, A and B simultaneously, and B alone. In addition, the character "I" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front"; "rear", "left", "right", "vertical", "horizontal", "top", "bottom", "inner", "outer", "clockwise", "counter-clockwise", "axial", "radial", "circumferential", etc. are based on the orientation or position relationship shown in the drawings and are merely intended to facilitate and simplify the description of the embodiments of the present application, rather than indicating or implying that the device or element considered must have a particular orientation or be constructed and operated in a particular orientation, and therefore not to be construed as limiting the embodiments of the present application.

In the description of the embodiments of the present application, unless otherwise explicitly specified and defined, the technical terms "mounting", "mutual connection", "connection", "fixing", etc. should be understood in a broad sense, for example, they may be a fixed connection, a detachable connection, or an integrated connection; may be a mechanical connection or an electrical connection; and may be a direct connection or an indirect connection through an intermediate medium, and may be communication between interiors of two elements or interaction between the two elements. For those of ordinary skill in the art, the specific meaning of the above terms in the embodiments of the present application can be understood according to specific situations.

In some cases, when an electrode assembly is wound, the head of a separator is usually clamped by using a winding needle assembly and wound for several turns, the heads of a cathode plate and an anode plate are then fed between two layers of separators, the cathode plate and the anode plate are clamped by means of the two separators for winding, and the heads of the cathode plate and the anode plate are prone to, when fed between the two separators, collide with the winding needle assembly, thus causing a problem that the heads of the cathode plate and the anode plate are bent.

In order to solve the problem, the applicant tried to adopt various structures, such as an air blowing mechanism, a guide mechanism, a suction mechanism, etc., so as to avoid the collision between the heads of the cathode plate and the anode plate and the winding needle assembly, but none of these structures can well solve the above problem.

According to further research, the applicant proposes a winding method, a winding machine, an electric motor assembly and a battery cell in the present application. The solution uses a winding needle assembly to simultaneously clamp the heads of a cathode plate, an anode plate and a separator for winding, so that the heads of a cathode, an anode and the separator are not in contact with an outer periphery of the winding needle assembly, and the problem is thus solved that the heads of the cathode plate and the anode plate collide with the winding needle assembly and are accordingly bent.

A winding method according to an embodiment of the present application will first be described with reference to the accompanying drawings.

Figure 1:
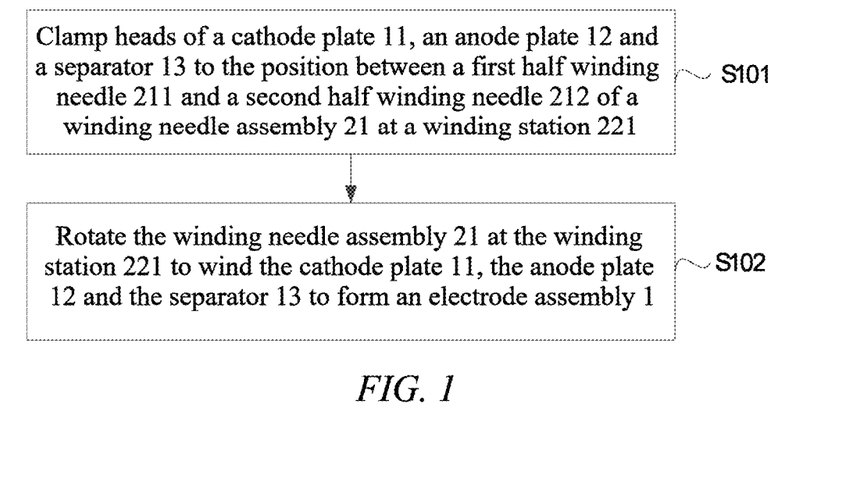
FIG. 1 is a flow chart of a winding method according to an embodiment of the present application.

Referring to FIG. 1, FIG. 1 is a flow chart of a winding method according to an embodiment of the present application. A winding method according to the embodiment of the present application is used for winding a cathode plate 11, an anode plate 12 and a separator 13 to form an electrode assembly 1. The method is applied to a winding machine. The winding machine includes a telescopically movable winding needle assembly 21. The winding needle assembly 21 includes a first half winding needle 211 and a second half winding needle 212 that are relatively movable.

As shown in FIG. 1, the winding method may include the following steps:

S101, clamping the heads of the cathode plate 11, the anode plate 12 and the separator 13 to the position between the first half winding needle 211 and the second half winding needle 212 of the winding needle assembly 21 at a winding station 221.

In the step, before the cathode plate 11, the anode plate 12 and the separator 13 are wound, the first half winding needle 211 and the second half winding needle 212 directly clamp the heads of the cathode plate 11, the anode plate 12 and the separator 13 that are fed in.

S102, rotating the winding needle assembly 21 at the winding station 221 to wind the cathode plate 11, the anode plate 12 and the separator 13 to form the electrode assembly 1.

In the step, a rotation direction of the winding needle assembly 21 may be clockwise or counterclockwise. The specific rotation direction is determined according to actual needs, and is not specifically limited in the present application.

According to the winding method provided in the present application, before winding the cathode plate 11, the anode plate 12 and the separator 13, the first half winding needle 211 and the second half winding needle 212 directly clamp the heads of the cathode plate 11, the anode plate 12 and the separator 13 that are fed, instead of the operation of first winding the separator 13 and then winding the cathode plate 11 and the anode plate 12 by means of the separator 13 in some cases. Therefore, the cathode plate 11 and the anode plate 12 can be prevented from being bent at the beginning of winding, and the problem is thus solved that in some cases, when the cathode plate 11, the anode plate 12 and the separator 13 are wound, the heads of the cathode plate 11 and the anode plate 12 are prone to be bent.

Figure 2:
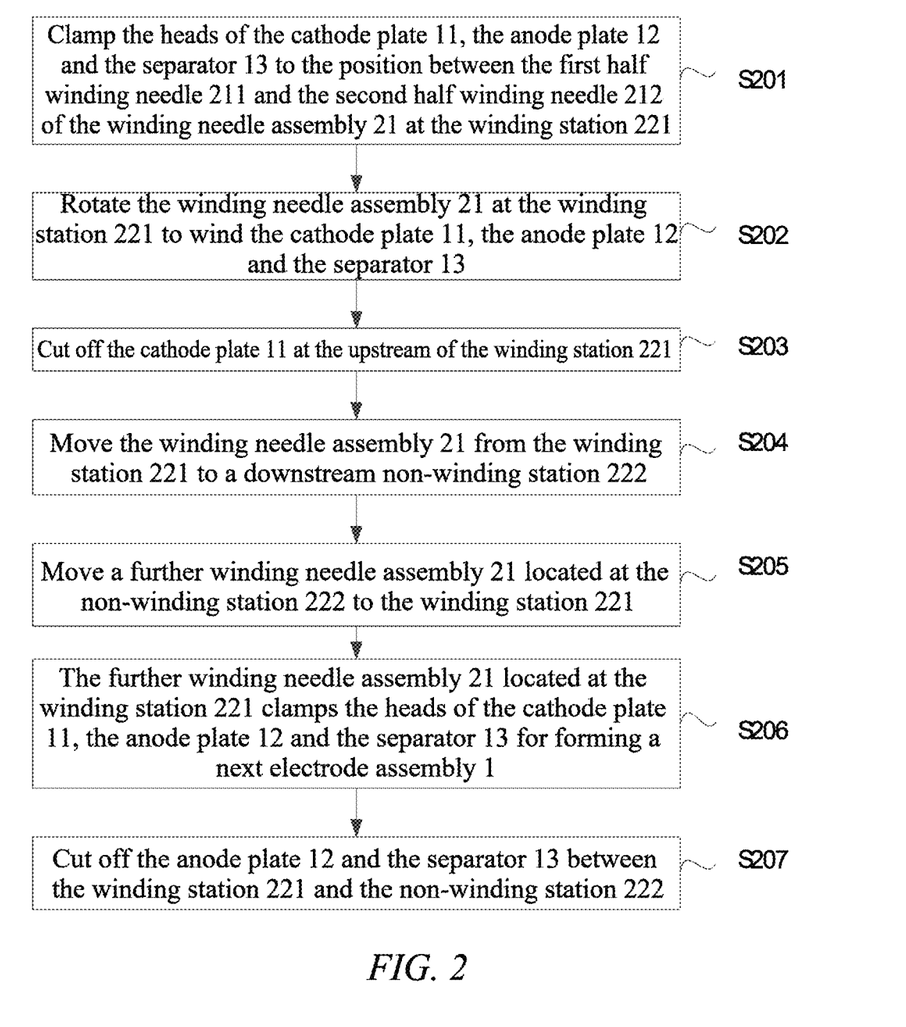
FIG. 2 is a flow chart of another winding method according to an embodiment of the present application.

Referring to FIG. 2, FIG. 2 is a flow chart of another winding method according to an embodiment of the present application. The embodiment of the present application further provides another winding method. The winding method includes:

S201, clamping the heads of the cathode plate 11, the anode plate 12 and the separator 13 to the position between the first half winding needle 211 and the second half winding needle 212 of the winding needle assembly 21 at the winding station 221.

S202, rotating the winding needle assembly 21 at the winding station 221 to wind the cathode plate 11, the anode plate 12 and the separator 13.

In the embodiment of the present application, steps S201 and S202 may be the same as steps S101 and S102 in the above-described embodiment, and will not be repeated herein.

S203, cutting off the cathode plate 11 at the upstream of the winding station 221.

S204, moving the winding needle assembly 21 from the winding station 221 to a downstream non-winding station 222.

In the step, the upstream and the downstream refer to the incoming and outgoing directions of the cathode plate 11, the anode plate 12 and the separator 13 relative to the winding station 221, which are not related to the position of the winding station 221 itself.

It should be noted that step S204 of moving the winding needle assembly 21 may be performed simultaneously with step S203 of cutting off the cathode plate 11 described above, or may be performed before or after step S203 of cutting off the cathode plate 11. The specific manner to be selected can be determined according to an actual length of the cathode plate 11.

It may be understood that by moving the winding needle assembly 21 at the winding station 221 to the downstream non-winding station 222, the winding of a next electrode assembly 1 can be prepared in advance, and accordingly, the production takt of the electrode assembly 1 can be continuously kept.

S205, moving a further winding needle assembly 21 located at the non-winding station 222 to the winding station 221.

It should be noted that step S205 of moving the further winding needle assembly 21 at the non-winding station 222 may be performed simultaneously with step S204 of moving the winding needle assembly 21, or may be performed before or after step S204 of moving the winding needle assembly 21, which is not specifically limited in the embodiment of the present application.

S206, the further winding needle assembly 21 located at the winding station 221 clamping the heads of the cathode plate 11, the anode plate 12 and the separator 13 for forming a next electrode assembly 1.

In the step, after the further winding needle assembly 21 located at the non-winding station 222 is moved to the winding station 221, the further winding needle assembly 21 may extend out and clamp the heads of the cathode plate 11, the anode plate 12 and the separator 13 for forming the next electrode assembly 1.

S207, cutting off the anode plate 12 and the separator 13 between the winding station 221 and the non-winding station 222.

After the anode plate 12 and the separator 13 are cut off, the above steps are repeated to continue clamping and winding of the next electrode assembly 1. The previous electrode assembly 1 then undergoes the subsequent steps of applying a finishing adhesive and discharge. Since applying a finishing adhesive and discharge are common general knowledge in the art, the description thereof will not be repeated herein.

In the solution provided in the embodiment of the present application, when the cathode plate 11, the anode plate 12 and the separator 13 are wound, the cathode plate 11 is first cut off, and when the cathode plate 11 is completely wound and only the anode plate 12 and the separator 13 are left, the anode plate 12 and the separator 13 are then cut off. In this way, the operation is omitted that when one electrode assembly 1 is wound at a time, the heads of the cathode plate 11, the anode plate 12 and the separator 13 are fed between the first half winding needle 211 and the second half winding needle 212. The first half winding needle 211 and the second half winding needle 212 at the winding station 221 only need to clamp the anode plate 12 and the separator 13 that are to be cut off, and the anode plate 12 and the separator 13 are then cut off between the winding station 221 and the non-winding station 222, without interrupted feedings, and thus the winding efficiency is improved.

In some embodiments of the present application, after step S203 of the above-described embodiment, the winding method may further include the following steps:

feeding the head of the cut cathode plate 11 between the first half winding needle 211 and the second half winding needle 212 of the further winding needle assembly 21 located at the winding station 221.

It can be understood that, by arranging the head of the cut cathode plate 11 between the first half winding needle 211 and the second half winding needle 212, it is possible to clamp and wind the heads of the cathode plate 11, the anode plate 12 and the separator 13 in step S206 of the above-described embodiment, so as to form the next electrode assembly 1.

In some embodiments of the present application, the winding method of the above-described embodiment further includes the following steps:

a clamping and feeding mechanism 3 jointly clamping, at the upstream of the winding station 221, the heads of the cathode plate 11, the anode plate 12 and the separator 13, and feeding them between the first half winding needle 211 and the second half winding needle 212.

In the embodiment of the present application, the clamping and feeding mechanism 3 may be used to drive the cathode plate 11, the anode plate 12 and the separator 13 into the winding mechanism or structure 2. By means of the clamping and feeding mechanism 3, it is possible to smoothly guide the heads of the cathode plate 11, the anode plate 12 and the separator 13 to the position between the first half winding needle 211 and the second half winding needle 212 of the winding mechanism 2. For clarity of layout, a specific structure of the clamping and feeding mechanism 3 will be specified in the following device embodiments.

In some embodiments of the present application, the winding method of the above-described embodiment may further include the following steps:

after the heads of the cathode plate 11, the anode plate 12 and the separator 13 are fed between the first half winding needle 211 and the second half winding needle 212, a telescoping mechanism or structure driving the clamping and feeding mechanism 3 that clamps the cathode plate 11, the anode plate 12 and the separator 13 to shift in a first direction L, wherein the direction in which the heads of the cathode plate 11, the anode plate 12 and the separator 13 are fed between the first half winding needle 211 and the second half winding needle 212 is a second direction M, and the first direction L intersects with the second direction M.

In the embodiment of the present application, the telescoping mechanism drives the clamping and feeding mechanism 3 to shift in the first direction L, so that the heads of the cathode plate 11, the anode plate 12 and the separator 13 can be retracted and arranged between the first half winding needle 211 and the second half winding needle 212, the anode plate 12 can thus be effectively prevented from being accumulated inside the electrode assembly 1, and the quality of the electrode assembly 1 can be improved. The telescoping mechanism may be an air cylinder, an oil cylinder, a ball screw, etc., which may be flexibly selected according to actual needs in practical applications.

Figure 3:
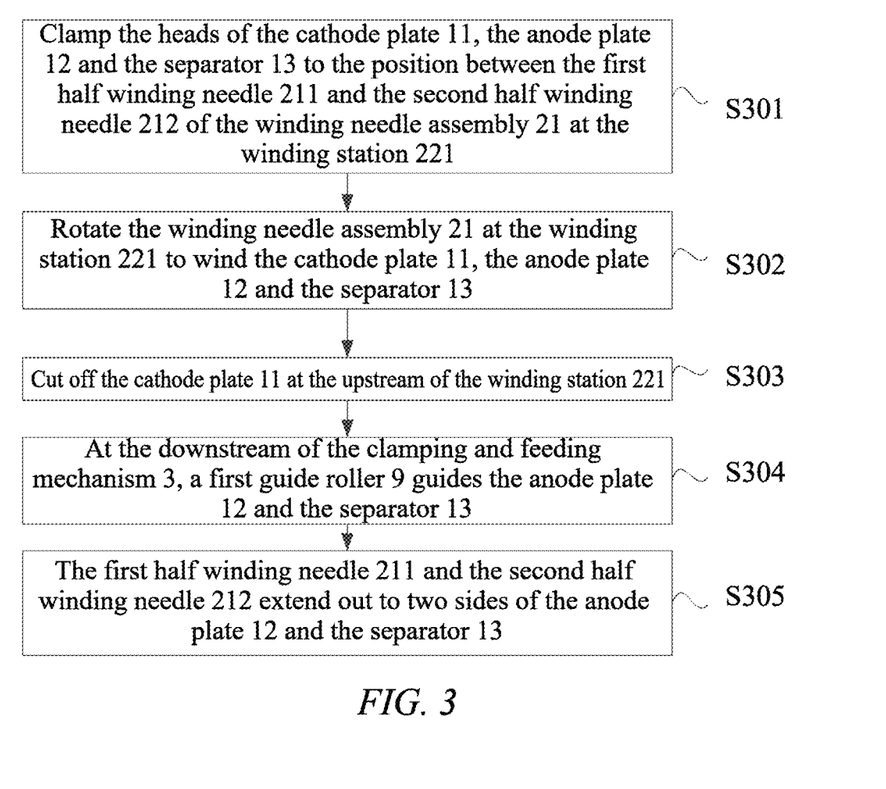
FIG. 3 is a flow chart of another winding method according to an embodiment of the present application.

In some embodiments of the present application, referring to FIG. 3, FIG. 3 is a flow chart of another winding method according to an embodiment of the present application. The winding method of the above-described embodiment includes the following steps:

Step S301: clamping the heads of the cathode plate 11, the anode plate 12 and the separator 13 to the position between the first half winding needle 211 and the second half winding needle 212 of the winding needle assembly 21 at the winding station 221.

Step S302: rotating the winding needle assembly 21 at the winding station 221 to wind the cathode plate 11, the anode plate 12 and the separator 13.

Step S303: cutting off the cathode plate 11 at the upstream of the winding station 221.

Step S301 described above is the same as step S201, step S302 is the same as step S202, and step S303 is the same as step S203, which will not be repeated herein. It should be understood that steps S301 to S303 described above are a process of winding the first electrode assembly.

Step S304: at the downstream of the clamping and feeding mechanism 3, a first guide roller 9 guiding the anode plate 12 and the separator 13.

Step S305: the first half winding needle 211 and the second half winding needle 212 extending out to two sides of the anode plate 12 and the separator 13.

In the step, the direction in which the cathode plate 11, the anode plate 12 and the separator 13 are fed between the first half winding needle 211 and the second half winding needle 212 is a second direction M, and an outer peripheral surface of the first guide roller 9 is tangent to the second direction M.

It should be understood that step S304 and step S305 are a process of winding other electrode assemblies following the first electrode assembly.

After the cathode plate 11 is cut off, when the cathode plate 11 needs to be fed into the clamping and feeding mechanism 3, the clamping and feeding mechanism 3 needs to be opened such that the cathode plate 11 can be smoothly fed into the clamping and feeding mechanism 3. Also, a gap between the anode plate 12 and the separator 13 is relatively large when the anode plate and the separator are not clamped by the clamping and feeding mechanism 3, a gap between the first half winding needle 211 and the second half winding needle 212 is limited due to the space limitation, and the first half winding needle 211 and the second half winding needle 212 will collide, when extending out to a position for clamping, with the anode plate 12 and the separator 13.

Therefore, it is required that after waiting for the clamping and feeding mechanism 3 to clamp the cathode plate 11, the anode plate 12 and the separator 13, the first half winding needle 211 and the second half winding needle 212 can extend out and clamp the cathode plate 11, the anode plate 12 and the separator 13, so the production efficiency is low. In the solution provided by the embodiment of the present application, by arranging the above first guide roller 9, a tension can be provided to the anode plate 12 and the separator 13, so that the anode plate 12 and the separator 13 are tightened and attached closely, and accordingly can be smoothly fed between the first half winding needle 211 and the second half winding needle 212, without waiting for the clamping and feeding mechanism 3 to clamp the cathode plate 11, the anode plate 12 and the separator 13, and the efficiency is thus improved.

In some embodiments of the present application, before the step of clamping the heads of the cathode plate 11, the anode plate 12 and the separator 13 between the first half winding needle 211 and the second half winding needle 212 of the winding needle assembly 21 at the winding station 221, the winding method of the above-described embodiment may include the following steps:

compounding the cathode plate 11, the anode plate 12 and the separator 13.

In the solution provided in the embodiment of the present application, before the step of clamping the heads of the cathode plate 11, the anode plate 12 and the separator 13 to the winding needle assembly 21, the cathode plate 11, the anode plate 12 and the separator 13 may also be compounded. Compounding methods include, but are not limited to, heat compounding or cold compounding by adding a binder to the separator 13. The compounding of the anode plate 12 and the separator 13 may be completed inside the winding machine or may be completed outside the winding machine and then wound by the winding machine.

In the embodiment of the present application, by compounding the cathode plate 11, the anode plate 12 and the separator 13, the cathode plate 11, the anode plate 12 and the separator 13 can be effectively fixed together such that the heads of the cathode plate 11, the anode plate 12 and the separator 13 are more easily fed between the first half winding needle 211 and the second half winding needle 212.

Figure 4:
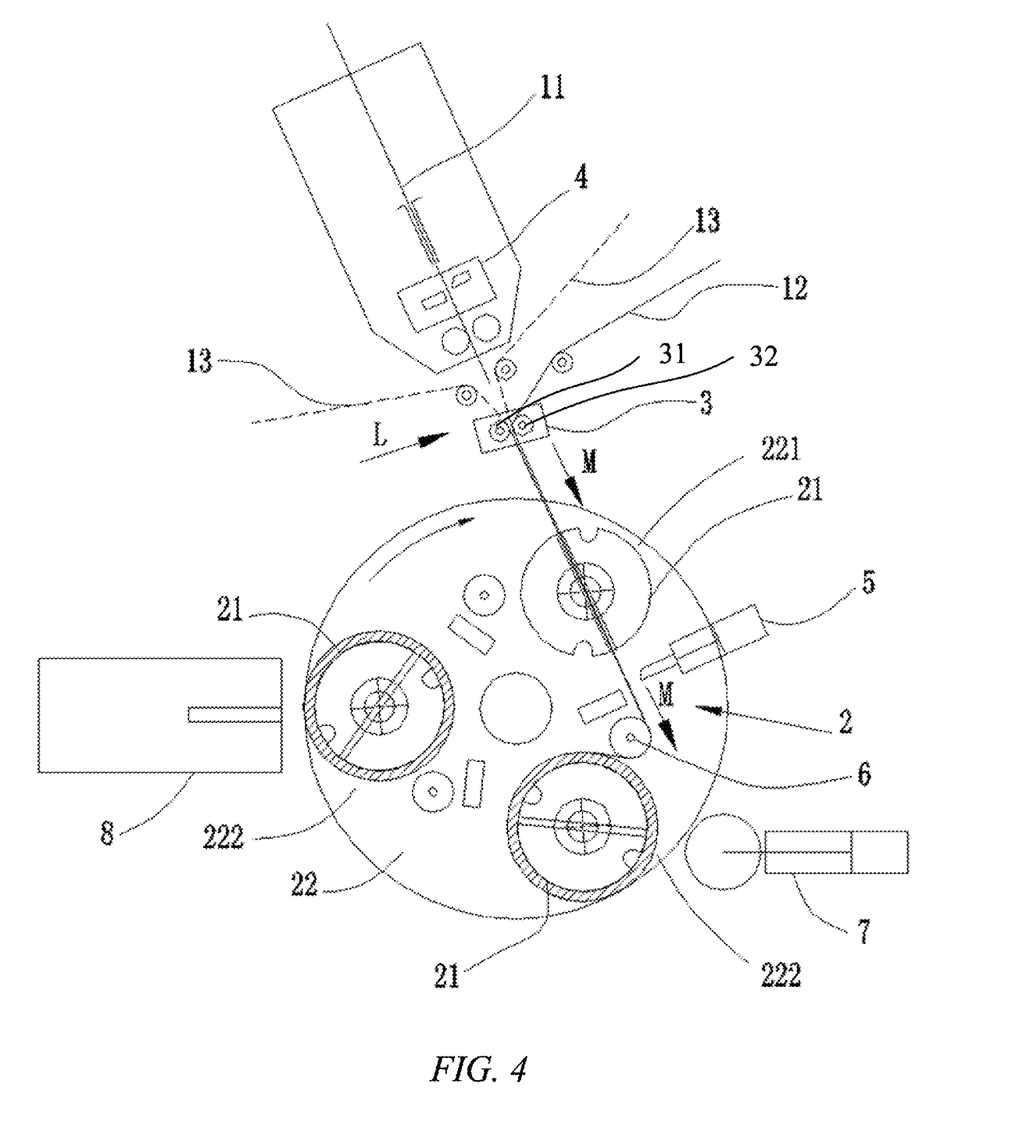
FIG. 4 is a schematic diagram of a winding machine, when clamping heads of a cathode plate, an anode plate and a separator, according to an embodiment of the present application.
Figure 5:
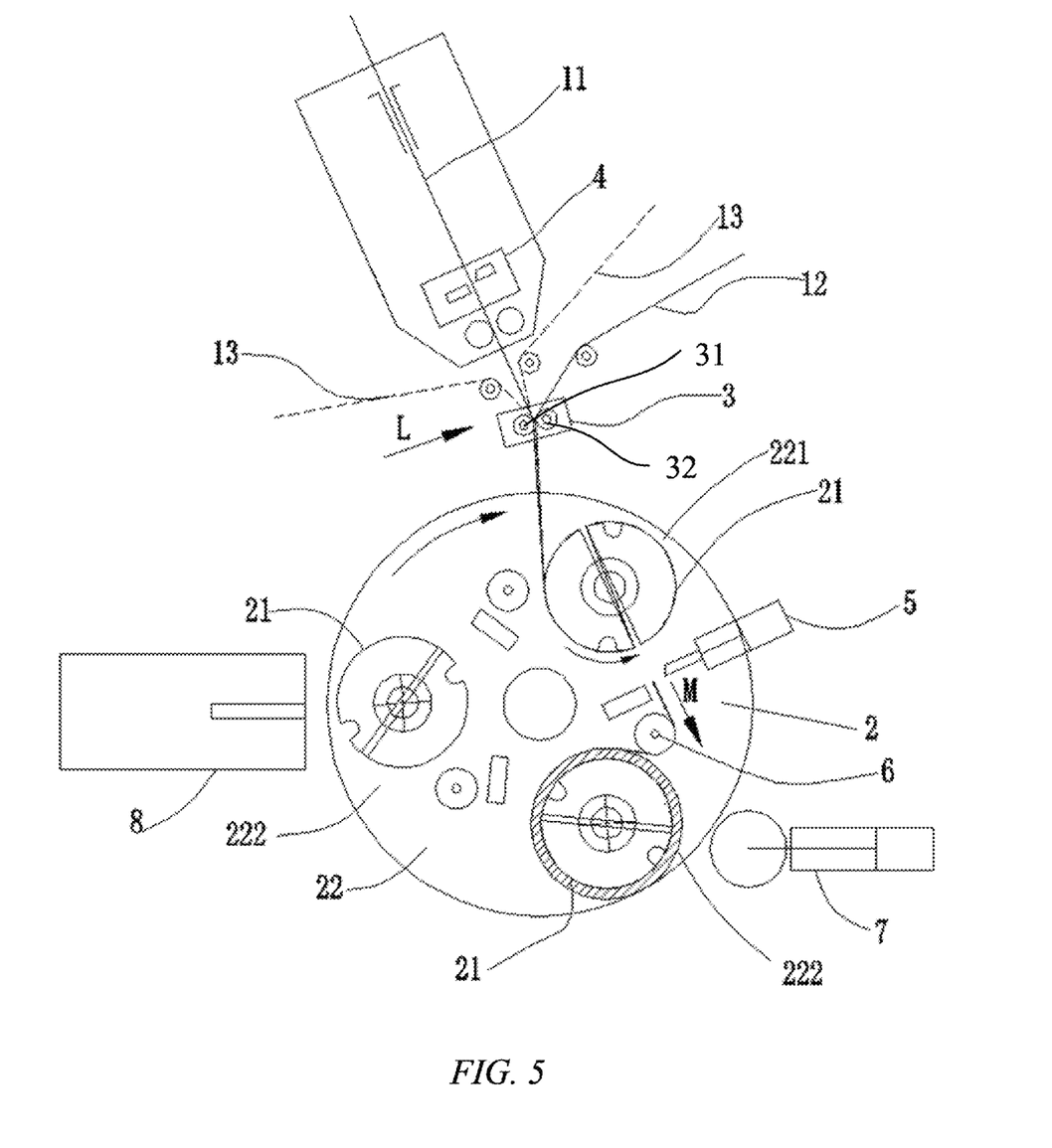
FIG. 5 is a schematic diagram of a winding machine, when cutting off an anode plate and a separator and winding a cathode plate, the anode plate and the separator, according to an embodiment of the present application.

Referring to FIGS. 4 and 5, FIG. 4 is a schematic diagram of a winding machine, when clamping heads of a cathode plate, an anode plate and a separator, according to an embodiment of the present application; and FIG. 5 is a schematic diagram of a winding machine, when cutting off an anode plate and a separator and winding a cathode plate, the anode plate and the separator, according to an embodiment of the present application.

As shown in FIGS. 4 and 5, the embodiment of the present application further provides a winding machine. The winding machine includes:

a winding mechanism 2 which includes a winding needle assembly 21, wherein the winding needle assembly 21 is used for winding a cathode plate 11, an anode plate 12 and a separator 13 to form an electrode assembly 1, and the winding needle assembly 21 includes a first half winding needle 211 and a second half winding needle 212, the first half winding needle 211 and the second half winding needle 212 being configured to be relatively movable to clamp the heads of the cathode plate 11, the anode plate 12 and the separator 13.

The winding needle assembly 21 may have various structures, for example, a columnar structure, a blocky structure, etc.; and the columnar structure and the blocky structure may be formed by splicing the first half winding needle 211 and the second half winding needle 212. The structures of the first half winding needle 211 and the second half winding needle 212 will be described in detail below and will not be repeated herein. In addition, the first half winding needle 211 and the second half winding needle 212 may each extend or retract in a width direction of the cathode plate 11 or the anode plate 12 (the direction perpendicular so as to the paper plane in FIGS. 4 and 5) to clamp the cathode plate 11, the anode plate 12 and the separator 13.

In the winding machine provided by the embodiment of the present application, the winding needle assembly 21 includes the first half winding needle 211 and the second half winding needle 212 that are relatively movable. Before the winding machine winds the cathode plate 11, the anode plate 12 and the separator 13, the first half winding needle 211 and the second half winding needle 212 directly clamp the heads of the cathode plate 11, the anode plate 12 and the separator 13 that are fed, instead of the operation of first winding the separator 13 and then winding the cathode plate 11 and the anode plate 12 by means of the separator 13 in some cases. Therefore, the cathode plate 11 and the anode plate 12 can be prevented from being bent at the beginning of winding, thereby solving the problem that in some cases, when the cathode plate 11, the anode plate 12 and the separator 13 are wound, the heads of the cathode plate 11 and the anode plate 12 are prone to be bent.

In some embodiments of the present application, the winding machine may further include: a clamping and feeding mechanism 3 that is arranged upstream of the winding mechanism 2, and used for clamping the heads of the cathode plate 11, the anode plate 12 and the separator 13 and feeding them between the first half winding needle 211 and the second half winding needle 212.

In the embodiment of the present application, by arranging the clamping and feeding mechanism 3 at the upstream of the winding mechanism 2, it is possible to smoothly guide the heads of the cathode plate 11, the anode plate 12 and the separator 13 to the position between the first half winding needle 211 and the second half winding needle 212 of the winding mechanism 2.

In some embodiments of the present application, the clamping and feeding mechanism 3 includes a first clamping roller 31, a second clamping roller 32 and a driving mechanism or structure, wherein the first clamping roller 31 and the second clamping roller 32 are configured to be relatively movable to clamp the cathode plate 11, the anode plate 12 and the separator 13, and the first clamping roller 31 and/or the second clamping roller 32 is connected to the driving mechanism so as to transfer the cathode plate 11, the anode plate 12 and the separator 13.

In the embodiments of the present application, by driving the first clamping roller 31 and/or the second clamping roller 32 to rotate by means of the driving mechanism, the traction drive of the cathode plate 11, the anode plate 12 and the separator 13 can be conveniently achieved, and the problem can be avoided that the cathode plate 11, the anode plate 12 and the separator 13 are pulled to cause damage.

Moreover, since the clamping and feeding mechanism 3 actively clamps and feeds the heads of the cathode plate 11, the anode plate 12 and the separator 13 into the winding mechanism 2 by means of the driving mechanism, namely, the clamping and feeding mechanism 3 provides a traction force to drive the cathode plate 11, the anode plate 12 and the separator 13 to move, so that the cathode plate 11, the anode plate 12 and the separator 13 can be uniformly stressed, and excessive deformation of the cathode plate 11, the anode plate 12 and the separator 13 can be avoided.

In some embodiments of the present application, the winding machine may further include: a telescoping mechanism, the telescopic mechanism being connected to the clamping and feeding mechanism 3 and used for driving the clamping and feeding mechanism 3 to move in a first direction L after the cathode plate 11, the anode plate 12 and the separator 13 are fed between the first half winding needle 211 and the second half winding needle 212; wherein the direction in which the cathode plate 11, the anode plate 12 and the separator 13 are fed between the first half winding needle 211 and the second half winding needle 212 is a second direction M, and the first direction L intersects with the second direction M.

The clamping and feeding mechanism 3 provided in the embodiment of the present application can not only drive the cathode plate 11, the anode plate 12 and the separator 13 to move, but the clamping and feeding mechanism 3 can also move under the drive of the telescoping mechanism. Specifically, the telescoping mechanism connected to the clamping and feeding mechanism 3 can push or pull the clamping and feeding mechanism 3 to move in the first direction L, wherein the first direction L intersects with the second direction M in which the cathode plate 11 and the separator 13 are fed between the first half winding needle 211 and the second half winding needle 212. An included angle formed by the first direction L and the second direction M may be an obtuse angle, an acute angle or a right angle.

In the embodiment of the present application, the telescoping mechanism drives the clamping and feeding mechanism 3 to shift in the first direction L, so that the heads of the cathode plate 11, the anode plate 12 and the separator 13 can be retracted and arranged between the first half winding needle 211 and the second half winding needle 212, the anode plate 12 can thus be effectively prevented from being accumulated inside the electrode assembly 1, and the quality of the electrode assembly 1 can be improved.

In some embodiments of the present application, the winding machine may further include: a first cutter 4 for cutting off the cathode plate 11, wherein the first cutter 4 is arranged upstream of the winding mechanism 2.

In the embodiment of the present application, the first cutter 4 is arranged upstream of the winding mechanism 2, so that when the cathode plate 11 is unwound to reach a preset length, the cathode plate 11 can be cut off in a timely manner.

In some embodiments of the present application, the winding mechanism 2 may further include a rotating tower 22, wherein a plurality of winding needle assemblies 21 are arranged on the rotating tower 22, the rotating tower 22 is used for causing the plurality of winding needle assemblies 21 to switch between the winding station 221 and the non-winding station 222, and the winding needle assemblies 21 at the winding station 221 are used for winding the cathode plate 11, the anode plate 12 and the separator 13 to form the electrode assembly 1.

The rotating tower 22 of the winding mechanism 2 can cause the plurality of winding needle assemblies 21 to switch between the winding station 221 and the non-winding station 222 by means of its own rotation. The plurality of winding needle assemblies 21 may be arranged on the rotating tower 22 in an annular array. The winding needle assembly 21 is telescopically moved and rotated relative to the rotating tower 22, so that the cathode plate 11, the anode plate 12 and the separator 13 can be clamped, released, and wound.

At least one non-winding station 222 is provided. When there is only one non-winding station 222, the non-winding station 222 can be used for applying a finishing adhesive to the electrode assembly 1 and discharging the same simultaneously. When there are two or more non-winding stations 222, the finishing adhesive may be applied to the electrode assembly 1 at one non-winding station 222, and the electrode assembly 1 may be discharged at the other non-winding station 222.

In the embodiment of the present application, continuous and uninterrupted production of the electrode assembly 1 can be achieved by switching the winding needle assemblies 21 between the winding station 221 and the non-winding station 222 by means of the rotating tower 22.

In some embodiments of the present application, the winding machine may further include a second cutter 5, wherein the second cutter 5 is used for cutting off the anode plate 12 and the separator 13, and the second cutter 5 is arranged between the winding station 221 and the non-winding station 222.

In the embodiment of the present embodiment, by arranging the second cutter 5 between the winding station 221 and the non-winding station 222, the anode plate 12 and the separator 13 can be simultaneously cut off after the cut cathode plate 11 is completely wound into the separator 13.

When the second cutter 5 is used for cutting, the anode plate 12 and the separator 13 can be simultaneously cut off by means of one cutting, instead of separately cutting the anode plate 12 and the separator 13 at twice; and in addition, the heads of the cut anode plate 12 and the separator 13 are clamped by the winding needle assembly 21 when the next electrode assembly 1 is wound, without performing a feeding operation again, and therefore, the winding efficiency can be further improved.

Figure 6:
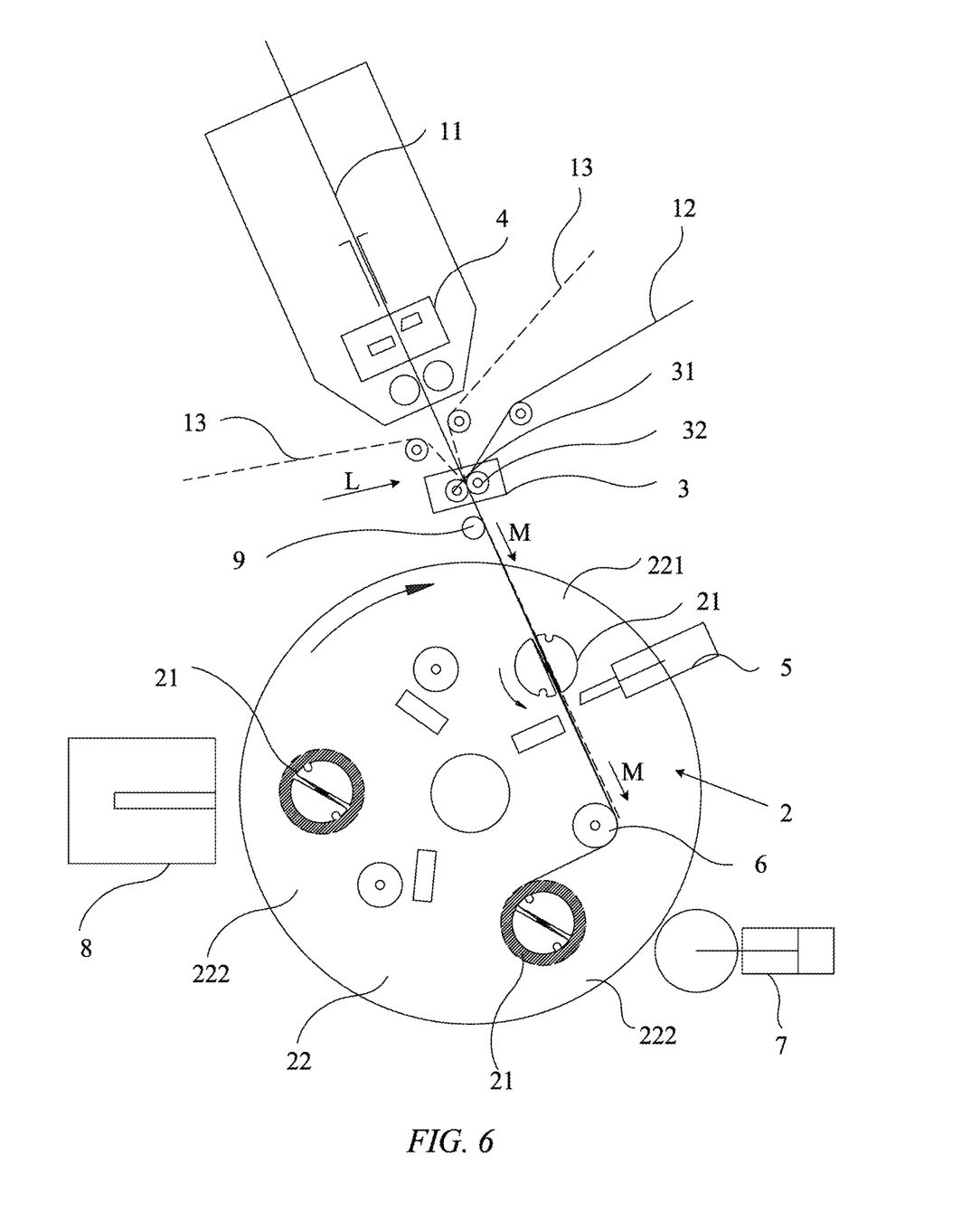
FIG. 6 is a schematic diagram of another winding machine, when clamping heads of a cathode plate, an anode plate, and a separator, according to an embodiment of the present application.

In some embodiments of the present application, referring to FIG. 6, the winding machine further includes a first guide roller 9, wherein the first guide roller 9 is arranged between the clamping and feeding mechanism 3 and the winding needle assembly 21.

In the process of feeding the cathode plate 11 into the clamping and feeding mechanism 3 after the cathode plate is cut off, the clamping and feeding mechanism 3 is opened such that the cathode plate 11 can be fed into the clamping and feeding mechanism 3; before the anode plate 12 and the separator 13 are fed into the winding needle assembly 2 from the clamping and feeding mechanism 3, the anode plate 12 and the separator 13 are not clamped by the clamping and feeding mechanism 3, such that the anode plate 12 and the separator 13 are relatively loose to be greatly spaced apart. In some cases, in order to avoid the anode plate 12 or the separator 13 from being bent due to the fact that the loose anode plate 12 and separator 13 are fed between the first half winding needle 211 and the second half winding needle 212, before the cathode plate 11 is fed into the clamping and feeding mechanism 3, the winding needle assembly 21 does not extend out to the two sides of the anode plate 12 or the separator 13, and only after the head of the cathode plate 11 is fed into the clamping and feeding mechanism 3, the clamping and feeding mechanism 3 clamps the cathode plate 11, the anode plate 12 and the separator 13 and the cathode plate 11, the anode plate 12 and the separator 13 are then attached together, the winding needle assembly 2 can extend out for winding. In the embodiment of the present application, by arranging the first guide roller 9, the first guide roller 9 provides a tension to the anode plate 12 and the separator 13, so that the anode plate 12 and the separator 13 are tightened and attached closely, even if the cathode plate 11 is not fed into the clamping and feeding mechanism 3, the anode plate 12 and the separator 13 can still be smoothly fed into the gap between the first half winding needle 211 and the second half winding needle 212, without waiting for the clamping and feeding mechanism 3 to clamp the cathode plate 11, the anode plate 12 and the separator 13, and the efficiency is thus improved.

In some embodiments of the present application, the direction in which the cathode plate 11, the anode plate 12 and the separator 13 are fed between the first half winding needle 211 and the second half winding needle 212 is the second direction M, and the outer peripheral surface of the first guide roller 9 is tangent to the second direction M, so that the anode plate 12 and the separator 13 can be attached to the first guide roller 9 during conveying, and the first guide roller 9 can provide the tension to the anode plate 12 and the separator 13.

In some embodiments of the present application, the winding machine may further include a second guide roller 6, wherein the second guide roller 6 is located between the winding station 221 and the non-winding station 222; wherein the direction in which the cathode plate 11, the anode plate 12 and the separator 13 are fed between the first half winding needle 211 and the second half winding needle 212 is the second direction M, and the second guide roller 6 is tangent to the second direction M.

In the embodiment of the present application, by arranging the second guide roller 6 tangent to the second direction M, the winding needle assembly 21 located at the winding station 221 can smoothly extend out and clamp the cathode plate 11, the anode plate 12 and the separator 13.

Figure 7:
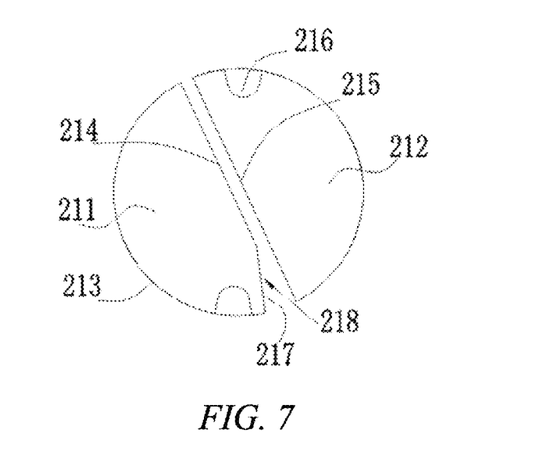
FIG. 7 is a schematic diagram of a winding needle assembly in the winding machine of FIG. 4.
Figure 8:
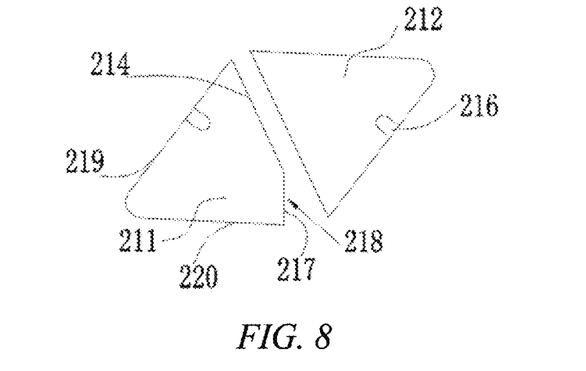
FIG. 8 is a schematic diagram of another winding needle assembly in the winding machine of FIG. 4.

In some embodiments of the present application, as shown in FIGS. 7 and 8, the first half winding needle 211 includes a first plane 214; the second half winding needle 212 includes a second plane 215; the first plane 214 and the second plane 215 are planes for clamping the cathode plate 11, the anode plate 12 and the separator 13; and a notch 218 is formed in an end of the first plane 214 or the second plane 215.

The notch 218 may be obtained by cutting out a part of the structure of the first half winding needle 211 or the second half winding needle 212. In the present application, the cross-sectional shapes of the first half winding needle 211 and the second half winding needle 212 are designed according to practical needs, for example, they may be semi-circular as shown in FIG. 7 or semi-rhombic as shown in FIG. 8. As shown in FIG. 7, when the cross sections of the first half winding needle 211 or the second half winding needle 212 is semi-circular, after a part of the structure is removed, the semi-circle may include an arc-shaped curved surface 213, the first plane 214 and a third plane 217 connecting the arc-shaped curved surface 213 to the first plane 214; wherein an included angle formed by the third plane 217 and the first plane 214 is an obtuse angle; and the arc-shaped curved surface 213 has a radian less than π. As also shown in FIG. 8, when the cross section of the first half winding needle 211 or the second half winding needle 212 is triangular, after a part of the structure is removed, the triangle may include the first plane 214, a fourth plane 219, a fifth plane 220, and the third plane 217 connecting the fifth plane 220 to the first plane 214.

Furthermore, outer circumferences of the first half winding needle 211 and the second half winding needle 212 are further provided with grooves 216, wherein the grooves 216 are used for clamping the electrode assembly 1 to achieve discharge of the electrode assembly 1.

In the embodiment of the present application, by forming the notch 218 in the end of the first plane 214 or the second plane 215, a path of the anode plate 12 and the separator 13 between the first plane 214 and the second plane 215 becomes long, it is thus possible to retract the heads of the cut anode plate 12 and separator 13 into the winding needle assembly 21, so that the cathode plate 11, the anode plate 12 and the separator 13 are located inside the first half winding needle 211 and the second half winding needle 212, preventing the cathode plate 11, the anode plate 12 and the separator 13 from being wound around the outer circumference of the first half winding needle 211 or the second half winding needle 212, preventing accumulation of the anode plate 12 inside the electrode assembly 1, and improving the quality of the electrode assembly 1.

In order to complete application of the finishing adhesive and discharge of the wound electrode assembly 1, as shown in FIGS. 4 and 5, the winding machine provided in the embodiment of the present application may further include a finishing adhesive application mechanism 7 and a discharging mechanism 8 that are arranged at the non-winding station 222. Since the finishing adhesive application mechanism 7 and the discharging mechanism 8 are common general knowledge in the art, they will not be repeated herein.

Figure 9:
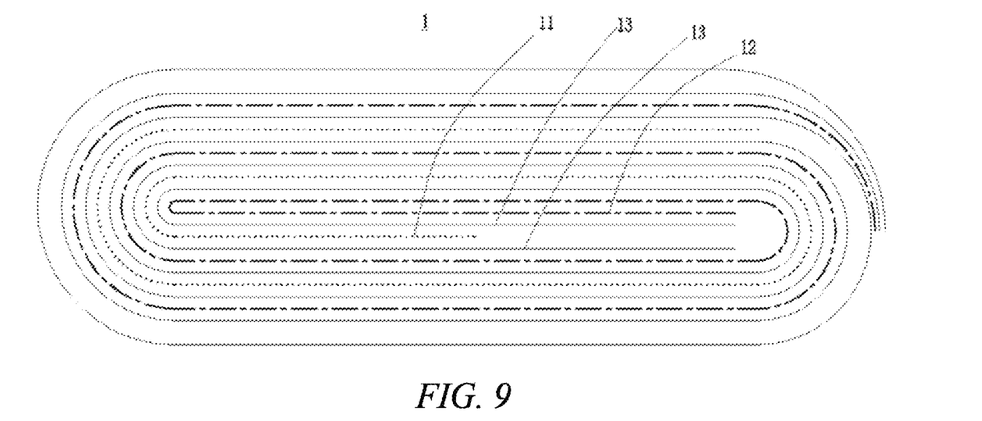
FIG. 9 is a schematic diagram of an electrode assembly according to an embodiment of the present application.

Besides, referring to FIG. 9, an embodiment of the present application further provides an electrode assembly 1. The electrode assembly 1 is manufactured using the winding method according to any one of the embodiments described above.

The electrode assembly 1 for a battery cell provided by the embodiment of the present application can be manufactured by means of the winding method in the above-described embodiment. It can be understood that since the heads of the cathode plate 11, the anode plate 12 and the separator 13 are first clamped, before the winding is started by means of the method of the above-described embodiment, between the first half winding needle 211 and the second half winding needle 212 of the winding needle assembly 21 at the winding station 221, the cathode plate 11, the anode plate 12 and the separator 13 manufactured by means of the method are located on the innermost ring of the electrode assembly 1.

In the battery cell provided in the embodiment of the present application, the heads of the cathode plate 11 and the anode plate 12 are flat, and the battery cell has the advantages of stable operation and safe and reliable use.

In some embodiments of the present application, the head of the anode plate 12 is flush with the head of the separator 13.

In some embodiments of the present application, a tail of the anode plate 12 is flush with a tail of the separator 13.

The electrode assembly 1 is formed by stacking and winding a cathode plate 11, an anode plate 12 and a separator 13. According to a winging direction, the anode plate 12 may be arranged on the uppermost or lowermost layer of the cathode plate 11 and the separator 13. It should be noted that with respect to different positions of the anode plate 12 described above, winding may be performed in the corresponding winding directions, so that the anode plate 12 in the obtained electrode assembly 1 is located at the innermost layer of the electrode assembly 1.

Since the separator 13 is wound first and the cathode plate 11 and the anode plate 12 are then wound when the electrode assembly is wound in some cases, the electrode assembly has a plurality of turns of separators 13 in some cases, wherein the plurality of turns of separators 13 do not participate in an electrode reaction. Compared with an electrode assembly in the related art, referring to FIG. 9, in the embodiment of the present application, since the heads and the tails of the anode plate 12 and the separator 13 are both flush, the separator 13 in the electrode assembly 1 becomes significantly shorter as compared to the electrode assembly in the related art. Therefore, the length of the separator 13 that does not participate in the electrode reaction is effectively decreased, and the energy density of the battery cell is increased.

Finally, an embodiment of the present application further provides a battery cell, including the electrode assembly 1 of any one of the embodiments described above.

Since the battery cell provided by the present application is provided with the electrode assembly 1, the battery cell has all the beneficial effects of the electrode assembly 1.

In some embodiments of the present application, two separators 13 are provided; and the cathode plate 11 is clamped between the two separators 13.

In the embodiment of the present application, the cathode plate 11 is clamped between the two separators 13, so that the cathode plate 11 can be protected by the separators 13 on the two sides, and the problem is solved that the head of the cathode plate 11 is bent.

Finally, it should be noted that the above embodiments are merely used for illustrating rather than limiting the technical solution of the present application. Although the present application has been illustrated in detail with reference to the foregoing embodiments, it should be understood by those of ordinary skill in the art that the technical solutions recorded in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. A winding method for winding a cathode plate, an anode plate and a separator to form an electrode assembly, the winding method comprising:
   clamping heads of the cathode plate, the anode plate and the separator between a first half winding needle and a second half winding needle of a winding needle assembly at a winding station;
   rotating the winding needle assembly at the winding station to wind the cathode plate, the anode plate and the separator to form the electrode assembly;
   cutting off only the cathode plate at the upstream of the winding station;
   moving the winding needle assembly from the winding station to a downstream non-winding station;
   moving a further winding needle assembly located at the non-winding station to the winding station;
   the further winding needle assembly located at the winding station clamping the heads of the cathode plate, the anode plate and the separator to form a next electrode assembly; and
   cutting off the anode plate and the separator between the winding station and the non-winding station.

2. The winding method according to claim 1, further comprising:
   feeding the head of the cut cathode plate between the first half winding needle and the second half winding needle of the further winding needle assembly located at the winding station.

3. The winding method according to claim 1, further comprising:
   a clamping and feeding structure jointly clamping, at the upstream of the winding station, the heads of the cathode plate, the anode plate and the separator, and feeding the heads between the first half winding needle and the second half winding needle.

4. The winding method according to claim 3, further comprising:
   after the heads of the cathode plate, the anode plate and the separator are fed between the first half winding needle and the second half winding needle, a telescoping structure driving the clamping and feeding structure that clamps the cathode plate, the anode plate and the separator to shift in a first direction, wherein the direction in which the heads of the cathode plate, the anode plate and the separator are fed between the first half winding needle and the second half winding needle is a second direction, and the first direction intersects with the second direction.

5. The winding method according to claim 3, further comprising:
   at the downstream of the clamping and feeding structure, a first guide roller guiding the anode plate and the separator; and
   the first half winding needle and the second half winding needle extending out to two sides of the anode plate and the separator;
   wherein the direction in which the cathode plate, the anode plate and the separator are fed between the first half winding needle and the second half winding needle is a second direction, and an outer peripheral surface of the first guide roller is tangent to the second direction.

6. The winding method according to claim 1, wherein before the step of clamping the heads of the cathode plate, the anode plate and the separator between a first half winding needle and a second half winding needle of a winding needle assembly at a winding station, the winding method further comprises:
   compounding the cathode plate, the anode plate and the separator.

7. An electrode assembly, wherein the electrode assembly is manufactured using the winding method according to claim 1.

8. The electrode assembly according to claim 7, wherein the electrode assembly comprises:
   a cathode plate, an anode plate and a separator, a head of the anode plate being flush with a head of the separator, wherein a tail of the anode plate is flush with a tail of the separator.

9. A battery cell, comprising the electrode assembly according to claim 7.

10. A winding machine, comprising:
    a winding structure which comprises a winding needle assembly, wherein the winding needle assembly winds a cathode plate, an anode plate and a separator to form an electrode assembly, and the winding needle assembly comprises a first half winding needle and a second half winding needle, the first half winding needle and the second half winding needle being configured to be relatively movable to clamp heads of the cathode plate, the anode plate and the separator, wherein the first half winding needle comprises a first plane; the second half winding needle comprises a second plane; the first plane and the second plane are planes for clamping the cathode plate, the anode plate and the separator; and a notch is formed in an end of the first plane or the second plane, the notch obtained by cutting out a part of a structure of the first half winding needle or the second half winding needle.

11. The winding machine according to claim 10, further comprising:

a clamping and feeding structure that is arranged upstream of the winding structure to clamp the heads of the cathode plate, the anode plate and the separator and feed the heads between the first half winding needle and the second half winding needle.

12. The winding machine according to claim 11, wherein the clamping and feeding structure comprises a first clamping roller, a second clamping roller and a driving structure, wherein the first clamping roller and the second clamping roller are relatively movable to clamp the cathode plate, the anode plate and the separator, and the first clamping roller and/or the second clamping roller is connected to the driving structure so as to transfer the cathode plate, the anode plate and the separator.

13. The winding machine according to claim 11, further comprising:

a telescoping structure connected to the clamping and feeding structure to drive the clamping and feeding structure to move in a first direction after the cathode plate, the anode plate and the separator are fed between the first half winding needle and the second half winding needle; wherein the direction in which the cathode plate, the anode plate and the separator are fed between the first half winding needle and the second half winding needle is a second direction, and the first direction intersects with the second direction.

14. The winding machine according to claim 11, further comprising:

a first guide roller that is arranged between the clamping and feeding structure and the winding needle assembly.

15. The winding machine according to claim 14, wherein the direction in which the cathode plate, the anode plate and the separator are fed between the first half winding needle and the second half winding needle is a second direction, and an outer peripheral surface of the first guide roller is tangent to the second direction.

16. The winding machine according to claim 10, further comprising:

a first cutter to cut off the cathode plate, wherein the first cutter is arranged upstream of the winding structure.

17. The winding machine according to claim 10, wherein the winding structure further comprise a rotating tower, wherein a plurality of the winding needle assemblies are arranged on the rotating tower to cause the plurality of winding needle assemblies to switch between the winding station and the non-winding station, and the winding needle assemblies at the winding station winds the cathode plate, the anode plate and the separator to form the electrode assembly.

18. The winding machine according to claim 17, further comprising a second cutter to cut off the anode plate and the separator, and the second cutter is arranged between the winding station and the non-winding station, the winding machine further comprising a second guide roller, the second guide roller being located between the winding station and the non-winding station, wherein the direction in which the cathode plate, the anode plate and the separator are fed between the first half winding needle and the second half winding needle is the second direction, and the second guide roller is tangent to the second direction.

* * * * *